United States Patent [19]
Capriles et al.

[11] Patent Number: 6,064,814
[45] Date of Patent: May 16, 2000

[54] AUTOMATICALLY UPDATED CROSS REFERENCE SYSTEM HAVING INCREASED FLEXIBILITY

[75] Inventors: Luis A. Capriles, Mentor; Robert R. Sepsi, Richmond Heights; Michael D. Kalan, Highland Heights, all of Ohio

[73] Assignee: Allen-Bradley Company, LLC, Milwaukee, Wis.

[21] Appl. No.: 08/970,124

[22] Filed: Nov. 13, 1997

[51] Int. Cl.$^7$ ................................................ G06F 11/34
[52] U.S. Cl. .................... 395/701; 395/703; 707/104; 707/103; 707/200
[58] Field of Search ................................. 395/701, 703; 707/102–104, 1, 8, 203, 530, 511

[56] References Cited

U.S. PATENT DOCUMENTS

| | | | |
|---|---|---|---|
| 5,235,701 | 8/1993 | Ohler et al. ................................... | 707/1 |
| 5,267,145 | 11/1993 | Zifferer et al. ............................ | 364/191 |
| 5,535,390 | 7/1996 | Hildebrandt ............................ | 711/154 |
| 5,550,976 | 8/1996 | Henderson et al. ..................... | 709/201 |
| 5,659,845 | 8/1997 | Krist et al. ................................. | 399/79 |
| 5,805,889 | 9/1998 | Van De Vanter ....................... | 395/703 |
| 5,878,408 | 3/1999 | Van Huben et al. ........................ | 701/1 |

OTHER PUBLICATIONS

Mick Jordan et al, "Software Configuration Management in an Object Oriented Database," 13 pages [online]. Sun Microsystems Laboratories, 1995 [retrieved on Sep. 1, 1999]. Retrieved from the Internet:<URL:http://www.sunlabs.com/research/forest/COM.Sun.Labs.F, Jun. 1995.

Steve Roti, "Indexing and Access Mechanisms," DBMS—May 1996, 6 pages [online]. DBMS Online [retrieved on Sep. 1, 1999]. Retrieved from the Internet:<URL:http://www.dbmsmag.com/9605d15.html>, May 1996.

*Primary Examiner*—Tariq R. Hafiz
*Assistant Examiner*—Tuan Q. Dam
*Attorney, Agent, or Firm*—David G. Luettgen; John J. Horn; John M. Miller

[57] ABSTRACT

A method of maintaining cross reference information regarding a user program comprises the steps of determining that an aspect of a first referencee has been modified, notifying a first referencer that the aspect of the first referencee has been modified, and updating cross reference information. The notifying step is performed by the first referencee, and the updating step is performed by the first referencer. The cross reference information is stored in a database comprising an entry for each reference made by a referencer to a referencee. Each entry stores a unique identifiers which identify a respective referencer and referencee. The cross reference information is automatically updated through a notification procedure in which referencees are responsible for notifying referencers when an aspect of the referencee changes, and the referencers are thereafter responsible for updating the cross reference information. The present invention provides increased flexibility in terms of the types of cross reference information which is maintained and the types of actions which a user is allowed to take without losing cross reference information. For example, the cross reference system is able to manage references to a referencee before the referencee is created and after the referencee is deleted.

26 Claims, 7 Drawing Sheets

| | 61 | 62 | 63 | 64 | 65 | 66 | 67 |
|---|---|---|---|---|---|---|---|
| 40 | REF'R UID | REF'E UID | R/W/RW | TYPE | BIT OFFSET | LENGTH | COUNT |
| | | | | | | | |
| | $UID_{27}$ | $UID_{37}$ | | | $B_0$ | L | |
| | | | | | | | |
| | | | | | | | |
| | | | | | | | |

AUTOMATICALLY UPDATED CROSS REFERENCE SYSTEM HAVING INCREASED FLEXIBILITY

BACKGROUND OF THE INVENTION

1. Field of the Invention

This invention relates to cross reference systems, and more particularly relates to a cross reference system that is automatically updated and that provides increased flexibility. The invention is particularly well-suited for use in object-oriented programming environments, for example, environments in which an object-oriented programming language is used or in which a programming language that is modeled using object-oriented techniques is used.

2. Description of Related Art

Cross reference systems are used in the context of microprocessor-based systems for assisting programmers with the development and maintenance of programs executed by such systems. A cross reference system provides information regarding a user program, such as the manipulation of data within the user program. For example, if a particular variable has an unexpected value, the cross reference system may be used to rapidly determine all of the locations in the user program that affect the errant variable. Thus, the cross reference system facilitates debugging the user program because it helps locate errors more rapidly. Such cross reference systems are often provided in conjunction with a utility used to write, test, and debug user programs.

In the past, cross reference systems have been used to assist the programming of industrial control systems, such as programmable controller systems. Industrial control systems are used to control industrial processes, and more particularly to control a plurality of output devices in response to a plurality of input devices. In the case of an industrial control system, the user program is a control program which defines the manner in which the plurality of output devices are controlled.

Industrial control systems are often programmed in an object-oriented programming environment. As is known, in an object oriented programming environment, the programming language is formed of or is modeled by a plurality of objects that each provide a set of services and that each have one or more attributes which define the parameters of the object or the services it provides.

Existing cross reference systems suffer from two main disadvantages. First, existing cross reference systems are inflexible. For example, existing cross reference systems expect the user (programmer) to take certain programming actions in a certain order, and are intolerant to an order which is different than the expected order. Additionally, existing cross reference systems only maintain cross reference information with respect to certain limited types of information (i.e., data). Even where cross reference information is maintained, the amount of the cross reference information which is maintained is limited. For example, if a data structure having several subcomponents is referenced, existing cross reference systems are only able to indicate that the data structure as a whole is referenced, and are unable to indicate which specific sub-component of the data structure is referenced.

Second, existing cross reference systems do not automatically update cross reference information. Rather than updating the cross reference information automatically with each change, existing cross reference systems require the user to actively request such an update. As a practical matter, the user requests such updates only infrequently. Consequently, between updates, some of the cross reference information is invalid. This situation is undesirable because it can cause the user to be under the false impression that a program is free of errors.

SUMMARY OF THE INVENTION

In order to overcome these drawbacks of the prior art, the present invention provides a method of maintaining cross reference information regarding a user program comprising the steps of determining that an aspect of a first referencee has been modified, notifying a first referencer that the aspect of the first referencee has been modified, and updating cross reference information. The notifying step is performed by the first referencee, and the updating step is performed by the first referencer.

According to another aspect, the present invention provides a cross reference system for use in an object-oriented programming environment comprising a referencee object, a referencer object, and a database. The referencer object makes a reference to the referencee object, and the database maintains cross reference information regarding the reference from the referencer object to the referencee object.

According to yet another aspect, the present invention provides a cross reference system comprising a plurality of referencees, a plurality of referencers, and a database. The plurality of referencees includes first and second referencees. The first referencee is assigned a first unique identifier, and the second referencee is assigned a second unique identifier.

The plurality of referencers includes first and second referencers. The first referencer is assigned a third unique identifier, and makes a first reference to the first referencee. The second referencer is assigned a fourth unique identifier, and makes a second reference to the second referencee.

The database includes a plurality of entries including first and second entries. The first entry corresponds to the first reference and includes a first field which contains the first unique identifier and a second field which contains the third unique identifier. The second entry corresponds to the second reference and includes a first field which contains the second unique identifier and a second field which contains the fourth unique identifier.

According to yet another aspect, the present invention provides a method of maintaining cross reference information regarding a user program comprising the steps of making a reference to a non-existent referencee (this step being performed by a referencer), creating a temporary referencee, maintaining cross reference information regarding the reference based on the temporary referencee, creating a new referencee which corresponds to the non-existent referencee by converting the temporary referencee into the new referencee, and maintaining cross reference information regarding the reference based on the new referencee after the new referencee is created.

The present invention enjoys a first main advantage in that it is more flexible than existing cross reference systems. In part, the increased flexibility derives from the fact that the present invention maintains more cross reference information than is maintained by existing cross reference systems. For example, the database stores information regarding whether a particular reference is destructive or non-destructive, and information regarding whether a particular subcomponent of a referencee is referenced (as opposed to the referencee as a whole).

Additionally, the present invention is able to handle name changes of referencees with ease. Moreover, the present invention is able to maintain cross reference information for more than just data. Additionally, the cross reference system is able to manage references to a referencee before the referencee is created and after the referencee is deleted.

Finally, the present invention enjoys a second main advantage in that the cross reference information which is maintained is automatically updated. For example, because the cross reference information is automatically updated in the present invention, error indicators displayed to the user can be re-verified automatically and kept current at all times, based on when referencee objects are changed.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 1A:
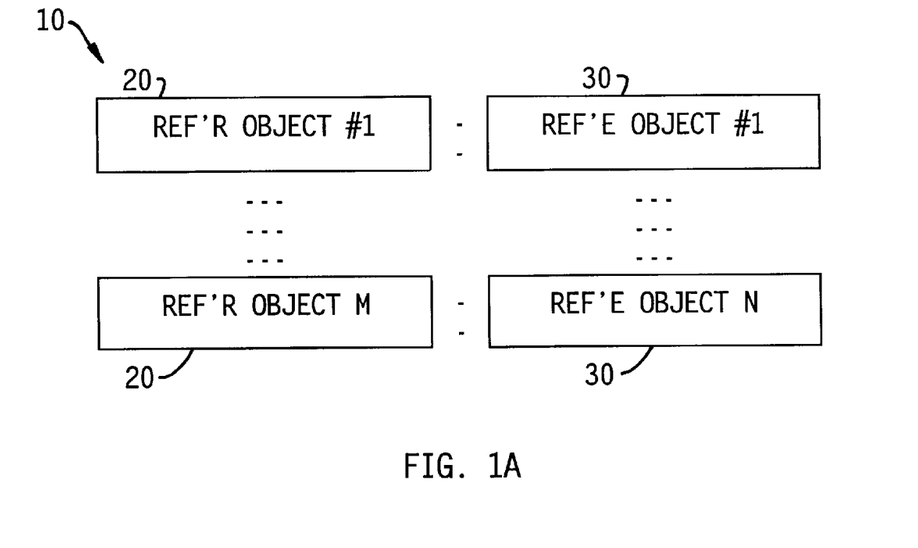
FIGS. 1A and 1B are a general overview of a cross reference system according to one embodiment of the invention.
Figure 1B:
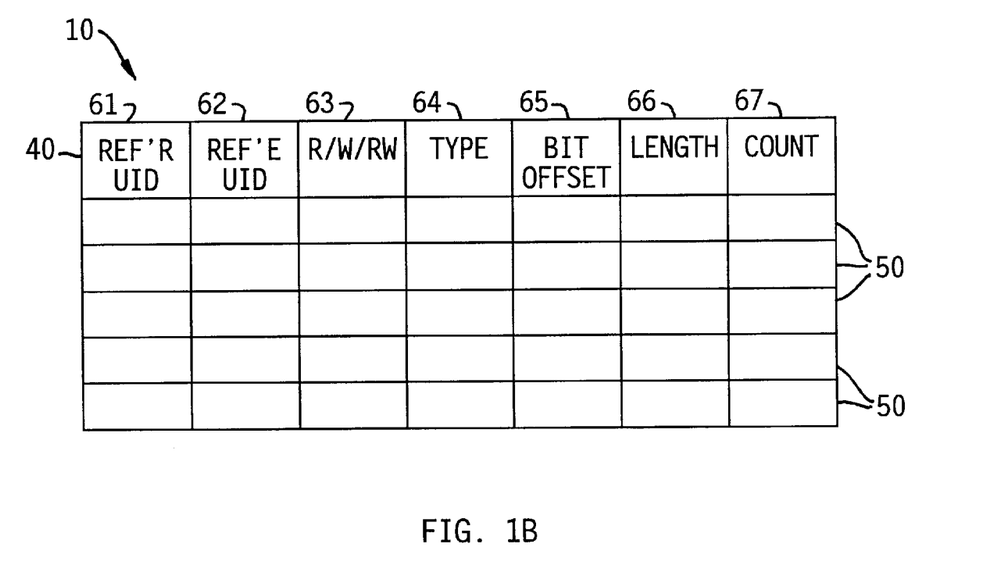

Referring now to FIGS. 1A and 1B, a general overview of a cross reference system 10 is illustrated. The cross reference system 10 is described in conjunction with an object-oriented programming environment. As previously mentioned, in an object-oriented programming environment, the programming language is formed of or is modeled by a plurality of objects that each provide a set of services and that each have one or more attributes which define the parameters of the object or the services it provides. More particularly, the invention is described in conjunction with a ladder logic programming language that is modeled using object-oriented programming techniques. A ladder logic programming language is a language in which instructions are displayed in the form of rungs of a ladder. It should be understood, of course, that the present invention could be used in conjunction with programming environments which are not object-oriented programming environments, and in conjunction with languages other than ladder logic programming languages.

The cross reference system 10 comprises a plurality of referencers 20, a plurality of referencees 30, and a cross reference database 40. Assuming the invention is implemented in an object-oriented programming environment, the plurality of referencers 20 are referencer objects, and the plurality of referencees 30 are referencee objects. A referencer is an object that makes a reference to ("references") another object, and a referencee object is an object to which a reference is made. Each cross reference in the user program is modeled as a reference between a single referencer object and a single referencee object. It should be noted, however, that any given object in a user program can make numerous references to different objects and can be the subject of numerous references by other objects. Therefore, a single given object in the user program (e.g., a rung of a ladder logic program) is likely to be both a referencer object 20 and a referencee object 30 in different circumstances.

The cross reference database 40 is a list of references made by referencer objects 20 to referencee objects 30. The database 40 comprises a plurality of entries 50. For each reference between a different referencer object 20 and a different referencee object 30, a separate entry 50 in the database 40 is maintained. Duplicative references between a same referencer object and a same referencee object are consolidated into one entry.

The database 40 provides a central location for the storage of cross reference information. The cross reference information is maintained according to an internally generated unique identifier (UID) which uniquely identifies objects in the system. The database 40 itself is implemented by an object which offers services for reading and changing the cross reference information. Beyond these services, the objects 20 and 30 have the responsibility for generating and keeping accurate the cross reference information contained in the database 40.

Specifically, the referencer objects 20 are responsible for updating (including adding, modifying and removing) entries 50 in the database 40. Generally speaking, the referencer objects 20 know how the referencee objects 30 are being referenced, and know what portions of the referencee objects 30 are implicated by a reference. Accordingly, the referencer objects 20 are in a suitable position to provide the necessary information for the entries 50.

The referencee objects 30 are responsible for notifying the referencer objects 20 that a given entry 50 in the database 40 may need to be modified. When an aspect of a referencee object 30 changes, the referencee object 30 is responsible for determining whether the change warrants notifying the referencer objects 20 that reference the referencee object 30. The referencee object 30 is also responsible for accessing the database 40 to determine which objects 20 reference the referencee object 30, so that these objects may be notified of the change. Upon being notified the change, the referencer objects 20 are then responsible for updating the database 40 as necessary to reflect any changes in the cross reference information. In practice, most objects offer both referencee object and referencer object functionality since, as previously noted, most objects are liable to be both a referencee object and referencer object in different circumstances.

This process occurs automatically and transparently to the user. In other words, the referencer objects 20 and referencee objects 30 automatically generate and maintain the accuracy of the cross reference information in the database 40 every time the user commits a change (e.g., every time the user presses "Enter" on a keyboard as the program is being edited). The user is not required to affirmatively instruct the cross reference system to update cross reference information in order for the cross reference information to be accurate.

Advantageously, therefore, the information in the database 40 is always accurate because it is automatically updated. For example, in the context of ladder logic programs, it is known to use an error indicator (e.g. "EEE") at the beginning a rung to indicate that there is a syntax or semantic error in the rung. Because the cross reference information is automatically updated in the present invention, this indicator can be re-verified automatically and kept current at all times, based on when referencee objects are changed. This is important because the usefulness of error indicators is greatly diminished (and may even become counterproductive) if the error indicators are not kept accurate.

Figure 2A:
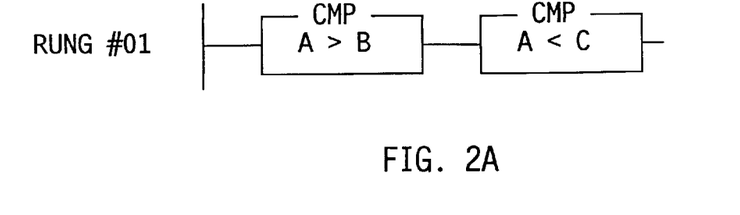
FIGS. 2A–2C exemplify the manner in which the cross reference system of FIGS. 1A and 1B stores information regarding references made by referencer objects to referencee objects.
Figure 2B:
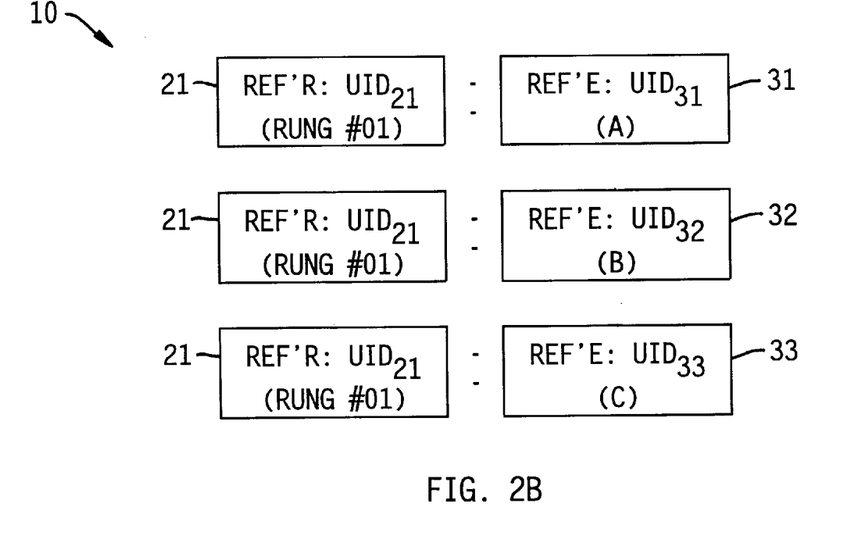
Figure 2C:
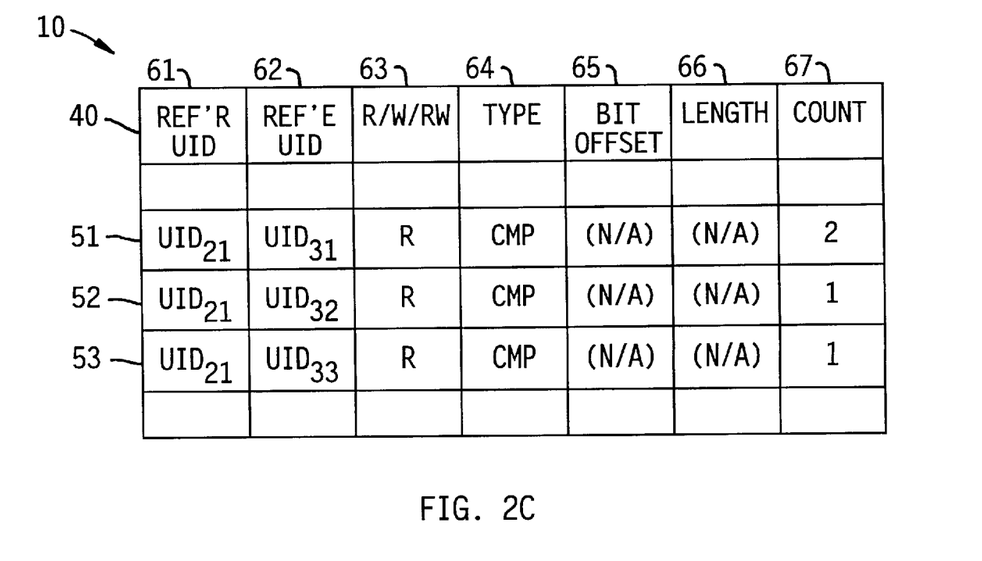

Referring now to FIGS. 2A–2C, a specific example of the manner in which the cross reference system stores information regarding references made by referencer objects to referencee objects is illustrated. Referring first to FIG. 2A, a rung of a ladder logic instruction is illustrated. The ning (RUNG #01) comprises a first operation (CMP) in which a variable A is compared with a variable B to determine if the variable A is greater than the variable B. The rung also comprises a second operation in which the variable A is compared with a variable C to determine if the variable A is less than the variable C.

FIGS. 2B and 2C illustrate how this information is stored by the cross reference system 10. A referencer object 21 is the rung (RUNG #01) and is assigned a unique identification number $UID_{21}$. Referencee objects 31, 32 and 33 are the variables A, B and C and are assigned unique identification numbers $UID_{31}$, $UID_{32}$ and $UID_{33}$, respectively. The referencer object 21 adds entries 51–53 to the database 40 which correspond to the references by the referencer object 21 to the referencee objects 31–33, respectively.

All of the entries in the database 40 comprise a plurality of fields 61–67. The first field 61 stores the unique identification number of the referencer object. For the entry 51, the field 61 stores the unique identification number $UID_{21}$ of the referencer object 21.

The field 62 stores the unique identification number of the referencee object. For the entry 51, the field 62 stores the unique identification number $UID_{31}$ of the referencee object 31 (the variable A).

The field 63 stores a value which indicates whether the referencer object references the referencee object in a non-destructive manner (read only), destructive manner (write), or both (read and write). For entry 51, since the compare instruction simply reads the variable A and does not change the variable A, the field 63 stores a value ("R"), corresponding to a read-only reference.

The field 64 stores the type of reference which the referencer object makes to the referencee object. For entry 51, the field 64 stores a value ("CMP") which corresponds to the compare instruction.

The fields 65 and 66 are not used in this example. These fields are discussed in greater detail in conjunction with FIGS. 6A and 6B.

The field 67 stores a count value corresponding to the number of times a given reference occurs between a given referencer object and a given referencee object. For the entry 51, since the referencer object 21 makes two references to the referencee object 31, the field 66 stores a count value of two.

The entries 52 and 53 are generally similar to the entry 51, except that they pertain to the referencee objects 32 and 33, respectively (the variables B and C, respectively). The entry 52 corresponds to the reference by the referencer object 21 to the referencee object 32. Therefore, instead of storing the unique identification number $UID_{31}$ of the referencee object 31, the field 62 of the entry 52 stores the unique identification number $UID_{32}$ of the referencer object 32. Similarly, the entry 53 corresponds to the reference by the referencer object 21 to the referencee object 33. Therefore, the field 62 of the entry 53 stores the unique identification number $UID_{33}$ of the referencer object 33. Finally, since the referencer object 21 only references the referencee objects 32 and 33 once, the fields 67 for the entries 52 and 53 store a count value of one.

In addition to the fields 61–67, any number of additional fields could also be maintained to provide additional information. For example, any given object will ordinarily have a parent routine and a parent program, or else will be of a global scope. The parent routine and parent program identity information could also be maintained in the database 40 through the addition of appropriate fields.

Advantageously, the fields 61–67 allow much more information to be maintained regarding references than is maintained by existing cross reference systems. For example, the cross reference system 10 is able to provide the user with information regarding whether a particular reference is destructive or non-destructive. This information is important, for example, in debugging, when the user needs to know all the locations in the user program where a particular variable could be changed.

Additional advantages are attained through the use of the unique identification numbers in fields 61–62. The use of the unique identification numbers is now described in greater detail in conjunction with FIGS. 3A, 3B, 4A, 4B, 5A and 5B.

Figure 3A:
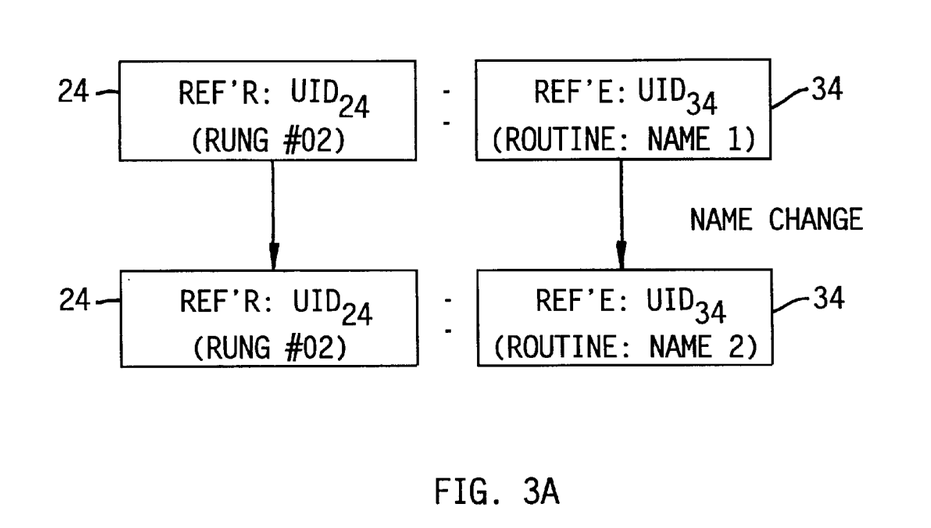
FIGS. 3A and 3B illustrate the operation of the cross reference system of FIGS. 1A and 1B when a referenced object is renamed.
Figure 3B:
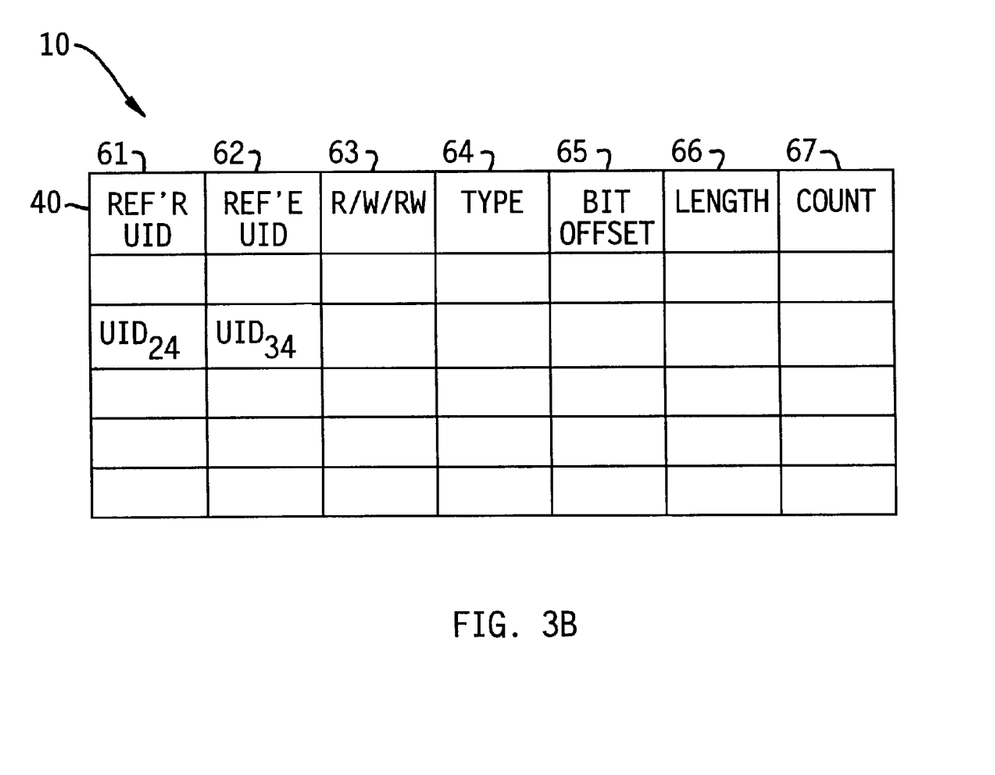

Referring now to FIGS. 3A and 3B, the operation of the cross reference system 10 in the event of a name change is illustrated. A referencer object 24 is a rung (RUNG #02) of the ladder logic program, and is assigned a unique identification number $UID_{24}$. The referencer object 24 references a referencee object 34 which is a routine and which is assigned a unique identification number $UID_{34}$.

The user originally gives the routine a first name (NAME #1) when the routine is created. The first name is used to establish the routine as a new object. However, the unique identification number $UID_{34}$ is immediately assigned to the new object, and the unique identification number $UID_{34}$ is thereafter used to maintain the cross reference information.

Eventually, the user decides that the first name is somewhat inaccurate, and that the routine would be more accurately named if given a second name (NAME #2). Therefore, the user causes to programming system to change the name of the routine from NAME #1 to NAME #2. By this time, however, the cross reference information in the database 40 is maintained on the basis of the unique identification number $UID_{34}$. Since the cross reference system 10 does not maintain cross reference information on the basis of the user-given names of the objects, nothing in the database 40 changes when the name of the referencee object 34 changes. Similarly, if the user causes the programming system to change the location at which the routine is stored, the change in address also has no impact on the cross reference system 10. Once the name change is made, NAME #2 is used automatically by the system instead of NAME #1 whenever the routine is displayed to the user, and there is no need for the user to manually change occurrences of NAME #1 to NAME #2 throughout the user program.

Advantageously, therefore, the use of unique identification numbers in fields 61 and 62 instead of object names or addresses enables the cross reference system 10 to manage name changes with ease. Since the cross reference system 10 does not maintain cross reference information on the basis of user-given names or addresses, changes in these names or addresses have little or no impact on the cross reference system 10.

Moreover, the use of unique identification numbers to maintain cross reference information also enables the cross reference system 10 to maintain cross reference information for more than just data. As previously noted, an object-oriented programming environment uses a plurality of objects, such as tags, rungs, routines, programs, tasks, devices, labels, user defined structures, and so on. Conceptually, assigning a unique identification number to an object which implements a data table is no different than assigning a unique identification number to any other type of object.

The ability to manage references to any type of information is facilitated by the fact that the cross reference system 10 is implemented in an object-oriented environment. In an object-oriented environment, lower level objects are derived from higher level objects and inherit the services and attributes of the higher level objects. Therefore, by defining a top level object which provides the services and attributes necessary for referencer/referencee object functionality, this functionality can easily be given to all lower level objects derived from the top level object. Additionally, the pervasiveness of the objects in an object-oriented programming environment makes the cross reference system readily applicable to all aspects of the user program.

The ability to cross reference information other than data is extremely useful. For example, the database 40 cross references all subroutine calls in the user program. This information can be readily used to analyze the flow of a program to ensure, for example, that particular steps in an industrial process are taken in a particular order.

Figure 4A:
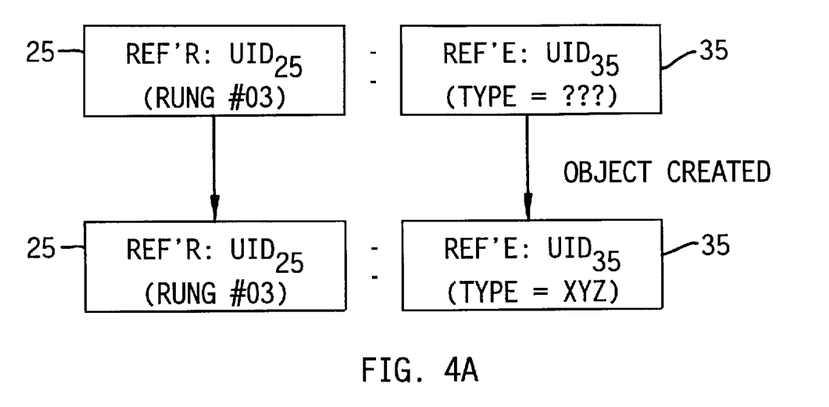
FIGS. 4A and 4B illustrate the operation of the cross reference system of FIGS. 1A and 1B when a non-existent object is referenced.
Figure 4B:
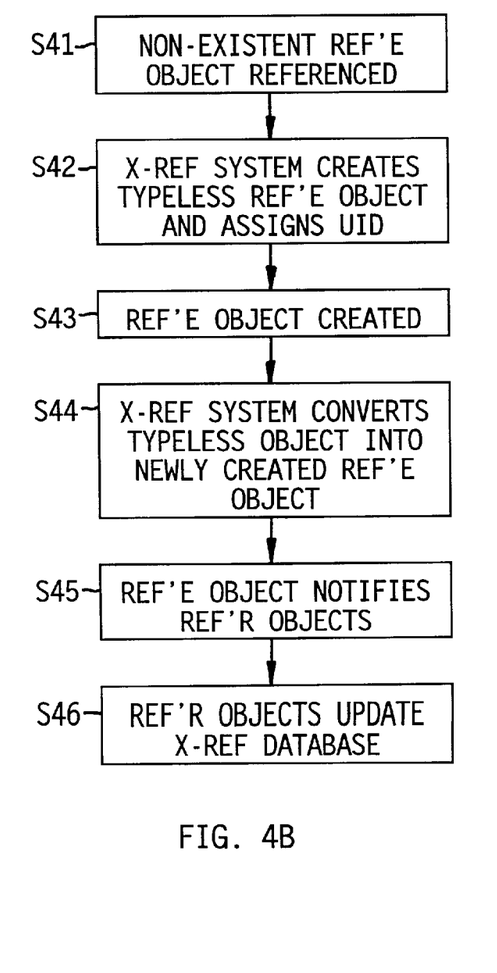

As noted above, a unique advantage of the cross reference system 10 is its tolerance to actions being taken in an unexpected order. A typical example is the referencing of an object before it has been created or after it has been deleted. Referring now to FIGS. 4A and 4B, the operation of the cross reference system 10 to manage a reference to a non-existent object is illustrated.

As illustrated in FIG. 4A, the user causes a referencer object 25 to reference an object which has not yet been created (step S41 in FIG. 4B). The referencer object 25 is, for example, a rung (RUNG #03) of the ladder logic program, and the referencee object is a variable which has not yet been defined.

The cross reference system 10 determines that no object currently exists which corresponds to the referenced object. Accordingly, the cross reference system 10 responds by creating a temporary typeless referencee object 35 and assigning the typeless referencee object 35 a unique identification number $UID_{35}$ (step S42). The typeless referencee object 35 need not be visible to the user. To the extent possible, the referencer object 25 attempts to insert values into the various fields 61–67 of the database 40, recognizing however that the inserted values may ultimately need to be changed. The unique identification number $UID_{35}$ of the typeless referencee object 35 is then used to maintain references to the referenced object until the referenced object is created.

Eventually, the user causes the programming system to create the referenced object corresponding to the typeless referencee object 35 (step S43). For example, the user defines the variable which is referenced in the rung (RUNG #03) of the user program. The cross reference system 10 recognizes that the name of the new object is the same as the name of the previously typeless referenced object, and assumes that the new object and the previously referenced object are the same. Therefore, the cross reference system 10 converts the typeless object 35 into the newly created object of the type (e.g., XYZ) specified by the user (step S44).

As previously noted, in the cross reference system 10, the referencee objects have the responsibility for notifying the referencer objects that a given entry in the database may need to be modified. The conversion from a typeless object into a non-typeless object is a change which warrants notification of any referencer objects (including the referencer object 25) which reference the referencee object 35.

Therefore, the referencee object 35 accesses the database 40 to assemble a list of objects which reference the referencee object 35. Among the objects on this list will be the referencer object 25. Once the list is assembled, the referencee object 35 notifies the referencer objects, including the referencer object 25, that a change has occurred and that the referencer objects may need to update the database 40 (step S45). As a result, the referencer objects update the database 40 with more specific cross reference information (step S46).

Advantageously, therefore, the cross reference system 10 is able to manage references to an object even before the object is created. This ability is provided through the unique identification number which is used to create temporary typeless objects. Thus, unlike existing cross reference systems, which expect the user to take certain programming actions in a certain order, the cross reference system 10 is tolerant of an order that is different than the expected order. For example. in existing, cross reference systems, the user is ordinarily expected to define variables before being allowed to reference the variables. In the cross reference system 10, either action can be taken first. The ability to take either action first provides important flexibility with respect to the work flow of the user.

Figure 5A:
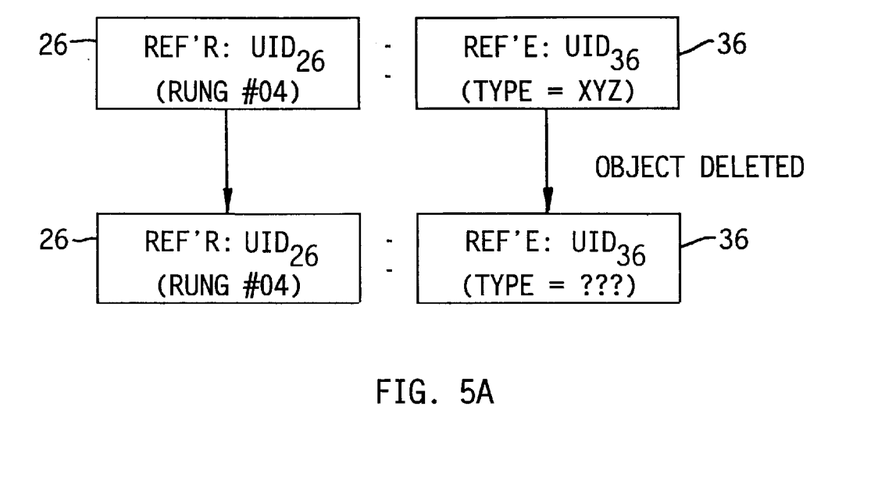
FIGS. 5A and 5B illustrate the operation of the cross reference system of FIGS. 1A and 1B when a referenced object is deleted.
Figure 5B:
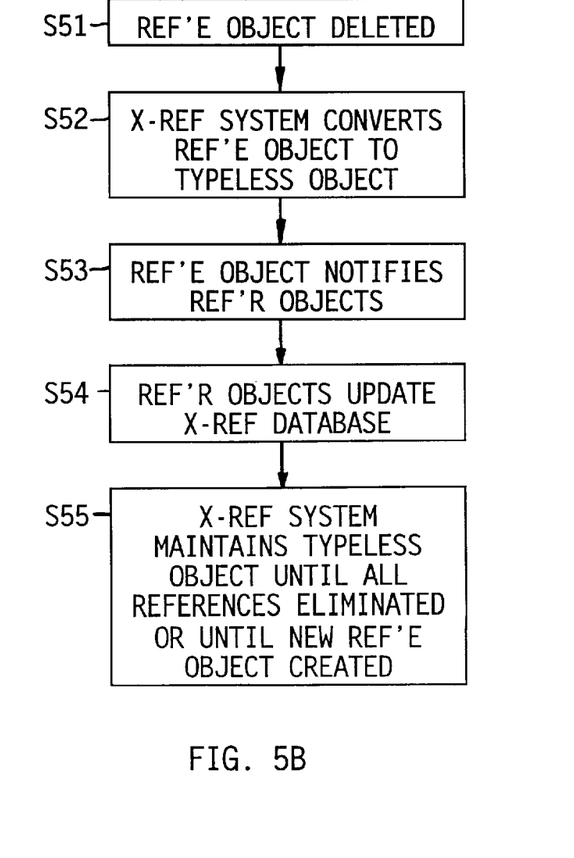

Referring now to FIGS. 5A and 5B, the operation of the cross reference system 10 to manage a reference to a deleted object is illustrated. Generally speaking, the operation of the cross reference system 10 to manage a reference to a deleted object (FIGS. 5A and 5B) is the inverse of the operation of the cross reference system 10 to manage a reference to a non-existent object (FIGS. 4A and 4B).

As illustrated in FIG. 5A, a referencer object 26 references an existing referencee object 36. The referencer object 26 is, for example, a rung (RUNG #04) of the ladder logic program, and the referencee object 36 is a routine which has been written.

The user decides to cause the programming system to delete the referencee object 36 (step S51). The cross reference system 10 recognizes the referencee object 36 is still referenced by other objects, and therefore converts the object into a typeless object (step S52). (If the referencee object 36 is not referenced by any objects, then the referencee object 36 is simply deleted and no typeless object is created.) Again, the conversion from a non-typeless object into a typeless object is a change that warrants notification of any referencer objects (including the referencer object 26) referencing the referencee object 36. Therefore, the referencee object 36 accesses the database 40 to assemble a list of the objects that reference the referencee object 36. Among the objects on this list is the referencer object 26. Once the list is assembled, the referencee object 36 notifies the referencer objects, including the referencer object 26, that a change has occurred and that the referencer objects may need to update the database 40 (step S53). The referencer objects then update the database 40 to the extent necessary (step S54). The typeless object 36 is then maintained (and therefore the cross reference information is maintained) until all references to the typeless object 36 are eliminated (step S55). Even though much of the cross reference information is probably invalid once the referencee object is deleted, much of the information remains valid and therefore is preserved (e.g., the fact that the deleted object is still referenced by other objects). Alternatively, if a new referencee object is created which corresponds to the typeless object, then the process of FIGS. 4A and 4B can be used to convert the typeless object back into a non-typeless object.

Advantageously, therefore, the cross reference system 10 allows deletion of referenced objects even though there remain objects which reference the deleted objects. Additionally, the cross reference system 10 maintains cross reference information regarding the deleted objects. This enables the referencee object to be re-created in another form with the cross reference information intact. This ability is provided through the unique identification number which is used to create a typeless objects. Again, this provides the user with flexibility: the user can either delete the referencee object first and then delete the references to the referencee object, or can delete the references and then delete the referencee object. Such flexibility is an important aspect of the "user-friendliness" of the programming environment.

In some circumstances, the deletion of an object does not automatically result in the creation of a typeless object. Rather, in some circumstances, references to one object having a first unique identifier are changed to references to a second object having a second unique identifier. This is what happens, for example, with respect to scoped variables.

The concept of scoped variables refers to the possibility that there could be two variables with the same name in the same program, for example, a global variable B and a local variable B, each with their own unique identifier. In the event that the referencee object corresponding to the local variable B is deleted, the referencee object ascertains whether there is a global variable with the same name (B). If so, the referencee object accesses the cross reference database 40 to assemble a list of the referencer objects that reference the referencee object. The referencee object then notifies the referencer objects that they must re-bind to the object corresponding to the global variable B, i.e., the referencer objects must reference the referencee object corresponding to the global variable B instead of the referencee object corresponding to local variable B. Consequently, the unique identifier for the local variable B in the cross reference database is changed to the unique identifier for the global variable B. In a second pass, the referencee object, i.e., the local variable B, notifies the referencer objects that they need to update their cross reference records.

An analogous process can also be applied in situations where a global variable B has been established, and the user suddenly causes the programming system to define a local variable B. In this case, after a new object with a new unique identifier is created for the local variable B, the appropriate referencer objects update the database 40 to reference referencee object corresponding to the local variable B instead of the referencee object corresponding to global variable B.

Figure 6A:
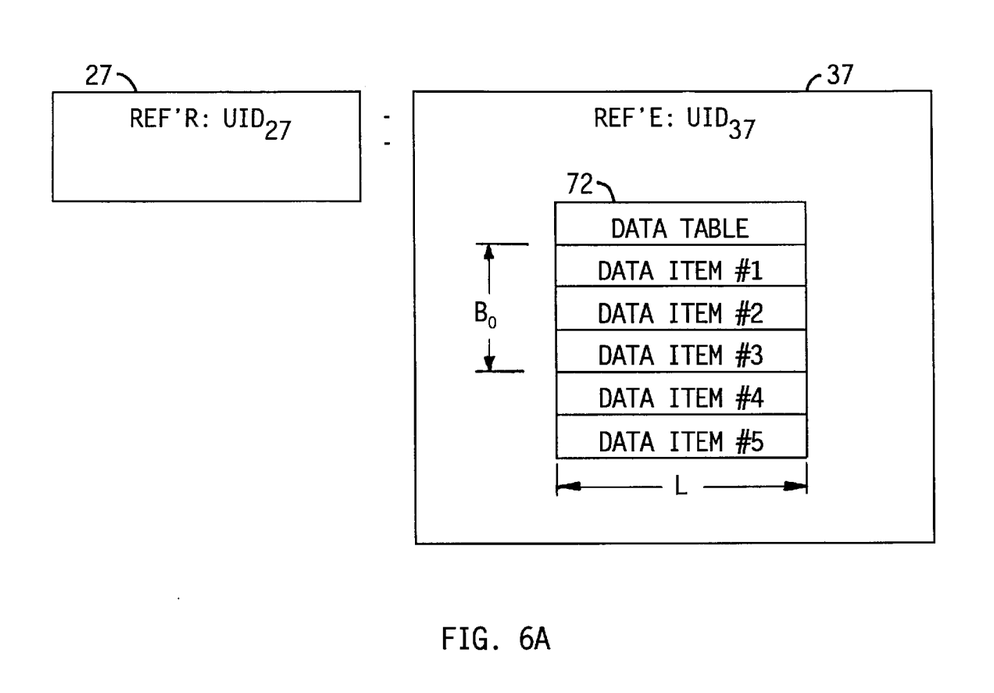
FIGS. 6A and 6B illustrate the operation of the cross reference system of FIGS. 1A and 1B to maintain cross reference information with respect to a sub-component of a data structure.
Figure 6B:
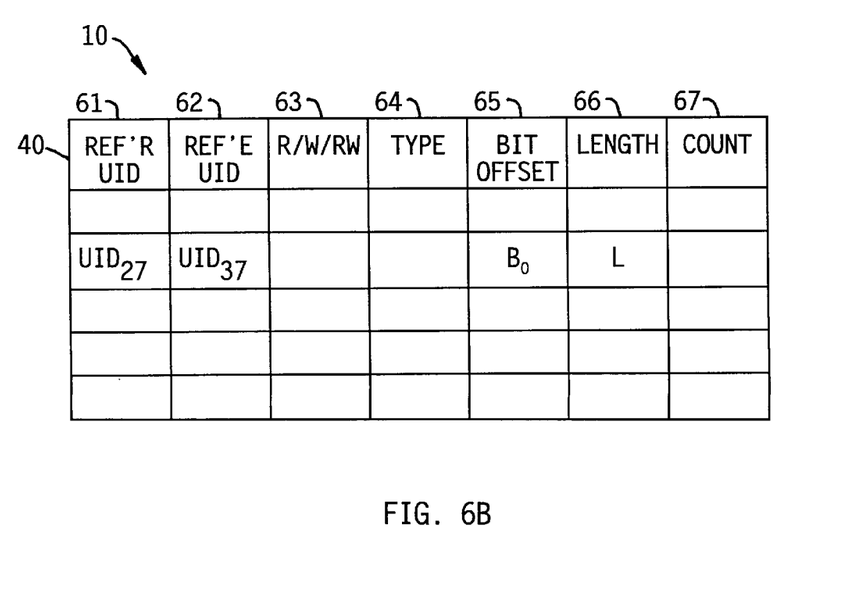

Referring now to FIGS. 6A and 6B, the operation of the cross reference system of FIGS. 1A and 1B to maintain cross reference information with respect to a sub-component of a data structure is illustrated. As previously noted, the fields 61–67 allow more information to be maintained regarding references than is maintained by existing cross reference systems. The use of the fields 65 and 66 to maintain cross reference information with respect to a sub-component of a data structure is now described.

A referencer object 27 references a referencee object 37. The referencee object 37 is a data structure 72 comprised of a plurality of data items (#1 to #5). The data structure 72 and its subcomponents occupy a space in memory which has been allocated for this purpose. Each of the data items is a subcomponent of the data table 72. The referencer object in particular references data item #4.

In order to manage references to the sub-components of the data table, the database 40 supports two additional fields 65 and 66. The field 65 is a bit offset ($B_O$) field, and indicates the number of bits between the memory address of the top of the data structure and the memory address of the data item of interest. The field 66 is the length (L) field, and indicates the number of bits of data being referenced. Of course, the offset and the length could also be measured in some other unit besides bits.

The fields 65 and 66 are initialized by the referencer object when the cross reference entry is created and are updated whenever the cross reference entry is modified. The bit offset and length information can then be used within the system to understand the data organization or structure of an object. Any type of reference can be detected, regardless whether it is to the entire data structure (more than just a particular data element) or only to a bit within the data structure.

Advantageously, therefore the cross reference system manages references to sub-components of an object not just to the object itself. The cross reference system is able to understand the data organization or structure of an object, and is able to determine which components of a given object are referenced (as compared to merely determining that the object as a whole is referenced). Therefore, the cross reference system 10 is capable of informing the user not only that a reference to a particular subcomponent of a data structure is also a reference to the data structure as a whole, but also that a reference to the data structure as a whole may have an effect on a particular subcomponent of the data structure.

Figure 7A:
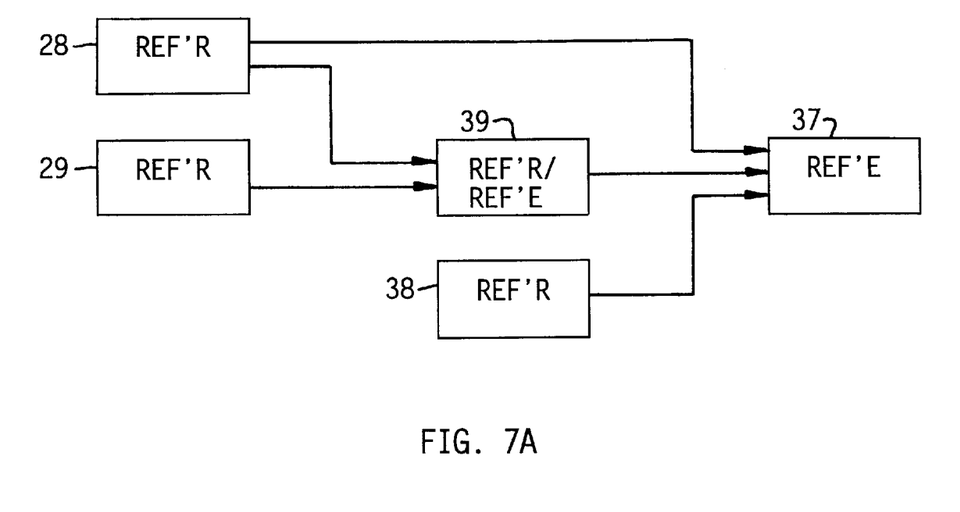
FIGS. 7A and 7B illustrate a recursive process used to notify multiple levels of referencer objects.
Figure 7B:
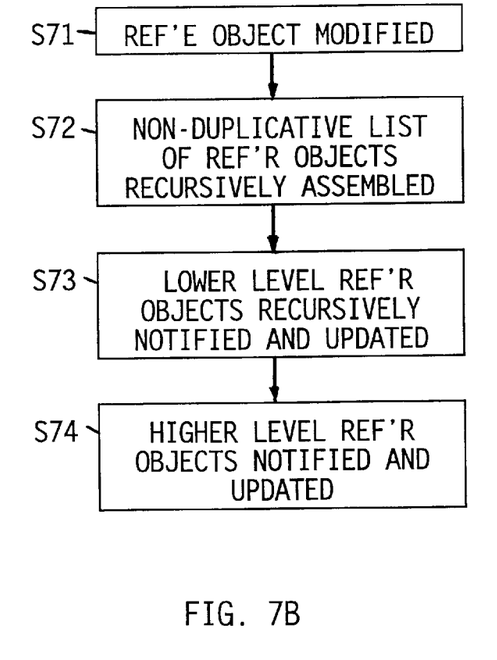

Referring now also to FIGS. 7A and 7B, the cross reference system 10 is also able to manage references to a sub-component of an object, even though the object is subject to change. For example, in FIG. 6A, the user may decide to insert a new data item #2½ in between data items #2 and #3. Ordinarily, the order of elements within a data structure is important, so it is not acceptable to simply add the new data item at the end of the data structure. When the new data item is inserted, the layout of the data structure changes, and it is necessary to update the fields 65 and 66.

Advantageously, however, the cross reference system 10 is able to manage references to a sub-component of an object, even though the object is subject to change. The ability to manage such references is essential in systems where the user is allowed to define structures such as user-defined data structures. This ability is now described in greater detail.

Again, it is the responsibility of the referencee object 37 to notify all the referencer objects which reference the referencee object 37 that a change has been made, so that the referencer objects can update the database 40. However, it should be noted that, because the objects that reference the data table may themselves also be referencee objects, it is usually necessary to notify multiple levels of referencer objects when the structure of the data table changes.

This is illustrated in greater detail in FIG. 7A. Specifically, the referencee object 37 is referenced by referencer objects 28, 38 and 39. In turn, the referencer object 39 is referenced by referencer objects 28 and 29. Therefore, referencer object 28 references the referencee object 37 both indirectly (by way of the referencer object 39) and directly. The referencer object 39 is a lower level referencer object as compared to the referencer objects 28 and 29, which are higher level referencer objects. In practice, there could be many more levels of objects than is illustrated.

There are two important aspects to the update process. First, cross references involving low level referencer objects (e.g., referencer object 39) are updated before cross references involving higher level referencer objects (e.g., referencer objects 28 and 29) are updated. In other words, no object is allowed to update itself until all of the objects that it references have been updated. This is necessary in order for the database 40 to contain correct cross reference information. Second, redundancies are avoided so that any given object only updates its cross reference information once, and not multiple times. The avoidance of redundancies enhances the performance of the cross reference system 10.

FIG. 7B illustrates the preferred update process in greater detail. In step S71, the user causes the programming system to modify the referencee object 37. For example, as described above, a new data item #2½ is inserted in between data items #2 and #3 in the referencee object 37.

To respond to this change, the referencee object 37 assembles a list of all of the objects that reference the references object 37 (step 72) by accessing the database 40. For example, the list includes the referencer objects 28, 38 and 39. Then, the objects that reference the referencee object 37 add to this list. For example, the referencer object 39 adds the referencer object 29 to the list. This process occurs recursively until all objects which reference the referencee object, either directly or indirectly, are listed. Additionally, before any object is added to the list, a check is made to determine if the referencee object is already listed, so as to avoid duplicate listings. Therefore, for example, the referencer object 28 is only listed once. None of the notifications occur until after the list is assembled.

After the list is assembled, a given referencer object attempts to update itself. The given referencer object then determines whether any objects that it references are on the list and, if so, then they are notified and they try to update themselves first. This occurs recursively until objects which do not reference any objects that are on the list are notified and update themselves (step S73). As each object is notified, it is removed from the list. Eventually, the higher level referencee objects are notified and updated as well (step S74).

It should be noted that, although the process illustrated in FIGS. 7A and 7B has been described in terms of a modification to a data structure, the process is used system-wide whenever the database 40 is updated. The process is discussed in conjunction with the modification of a data structure only because a data structure is a typically low level object which is likely to be referenced by multiple levels of referencer objects, and therefore provides a convenient example for describing more fully the preferred update process.

Many other changes and modifications may be made to the present invention without departing from the spirit thereof. The scope of these and other changes will become apparent from the appended claims.

We claim:

1. A method of maintaining cross reference information regarding a user program, said user program comprising a plurality of referencers which make references to a plurality of referencees, including a first referencer which makes a first reference to a first referencee, the method comprising the steps of:

determining that an aspect of said first referencee has been modified;

notifying said first referencer that said aspect of said first referencee has been modified, said notifying step being performed by said first referencee; and updating said cross reference information, said updating step being performed by said first referencer.

2. A method according to claim 1, wherein said notifying step further comprises the following steps, performed by said referencee object:

accessing said cross reference information; and determining, based on said cross reference information, that said first referencer references said first referencee.

3. A method according to claim 1, wherein said plurality of referencers includes a second referencer that makes a second reference to a non-existent referencee, and wherein the method further includes the step of maintaining cross reference information regarding said second reference by said second referencer to said non-existent referencee.

4. A method according to claim 3, wherein said storing step further comprises the steps of:

creating a temporary referencee;

maintaining said cross reference information regarding said second reference based on said temporary referencee;

creating a second referencee which corresponds to said non-existent referencee by converting said temporary referencee into said second referencee; and maintaining cross reference information regarding said second reference based on said second referencee after said second reference is created.

5. A method according to claim 1, wherein said cross reference information is stored independently of user-given names of said plurality of referencers and said plurality of referencees.

6. A method according to claim 1, wherein said first referencee is a global variable, wherein said plurality of referencees further include a second referencee which is a local variable, and further comprising the steps of:

deleting said local variable;

updating references to said local variable so that said references to said local variable are instead made to said global variable.

7. A method according to claim 1, wherein there are multiple levels of referencers which are notified as a result of said modification to said first referencee, and wherein lower level referencers are updated before higher level referencers are updated.

8. A method according to claim 7, wherein, for all referencees, said notifying step further comprises the following steps, which are performed recursively (1) identifying referencer objects which reference a given referencee object, and determining whether a given referencer object is referenced by any upper level referencer objects which have not previously been identified, (2) and, if so, then repeating said identifying step (1) with respect to the upper level referencers which have not been identified, and, if not, then repeating said identifying step (1) for another referencer until all referencers have been identified; and wherein, for all referencers, said updating step further comprises the following steps, which are performed recursively:

(1) determining whether a given referencer references any lower level referencers which reference said first referencee and which have not been updated, (2) and, if so, then repeating said determining step (1) with respect to the lower level referencers which have not been updated, and, if not, then updating said given referencer and repeating said determining step (1) for another referencer until all referencers have been updated.

9. A method according to claim 1, wherein said cross reference information includes information regarding whether said first reference is destructive.

10. A method according to claim 1, wherein said first referencee comprises a plurality of subcomponents;

wherein said first referencer references one of said plurality of subcomponents of said referencee object; and wherein said cross reference information includes information indicating which one of said plurality of subcomponents of said referencee is referenced by said referencer.

11. A method according to claim 1, wherein said method is implemented in an object-oriented programming environment.

12. A cross reference system for maintaining cross reference information regarding a user program in an object-oriented programming environment, the cross reference system comprising:

a referencee object;

a referencer object, said referencer object making a reference to said referencee object;

a database, said database maintaining cross reference information regarding said reference from said referencer object to said referencee object.

13. A cross reference system according to claim 12, wherein said database is automatically updated each time an aspect of said referencee object changes.

14. A cross reference system according to claim 12, wherein said referencee object is responsible for notifying said referencer object when an aspect of said referencee object changes, and wherein said referencer object is responsible for updating said database after being notified by said referencee object that said aspect of said referencee object has changed.

15. A cross reference system according to claim 12, wherein said database stores a first unique identifier which identifies said referencee object; and wherein said database stores a second unique identifier which identifies said referencer object.

16. A cross reference system according to claim 12, wherein said database stores information regarding whether said reference from said referencer object to said referencee object is destructive.

17. A cross reference system according to claim 12, wherein said references object comprises a plurality of subcomponents;

wherein said referencer object references one of said plurality of subcomponents of said referencee object; and wherein said database stores information indicating which one of said plurality of subcomponents of said referencee object is referenced by said referencer object.

18. A cross reference system according to claim 12, further comprising a plurality of additional objects for which cross reference information is maintained, said plurality of additional objects being objects of different types including data objects, subroutine objects, and subroutine call objects.

19. A cross reference system according to claim 12, wherein said referencer object and said referencee object are objects of a control program for an industrial controller.

20. A cross reference system for maintaining information regarding references in a user program, the cross reference system comprising:

A. a plurality of referencees including first and second referencees, 1. said first referencee being assigned a first unique identifier, and 2. said second referencee being assigned a second unique identifier;

B. a plurality of referencers including first and second referencers, 1. said first referencer being assigned a third unique identifier, and said first referencer making a first reference to said first referencee, 2. said second referencer being assigned a fourth unique identifier, and said second referencer making a second reference to said second referencee; and C. a database, said database including a plurality of entries including first and second entries, 1. said first entry corresponding to said first reference, said first entry including a first field which contains said first unique identifier and a second field which contains said third unique identifier, and 2. said second entry corresponding to said second reference, said second entry including a first field which contains said second unique identifier and a second field which contains said fourth unique identifier.

21. A cross reference system according to claim 20, wherein said first referencee is responsible for notifying said first referencer when an aspect of said first referencee changes, and wherein said first referencer is responsible for updating said database after being notified by said referencee that said aspect of said referencee has changed.

22. A cross reference system according to claim 20, wherein said first and second referencees and said first and second referencers are all objects of a control program for an industrial controller.

23. A cross reference system according to claim 20, wherein said plurality of referencers includes a third referencer, said third referencer being assigned a fifth unique identifier, and said third referencer making a third reference to a non-existent referencee, wherein said plurality of entries includes a third entry, said third entry corresponding to said third reference, said third entry including a first field which contains said fifth unique identifier and a second field which contains a sixth unique identifier, said sixth unique identifier being assigned to a temporary referencee which corresponds to said non-existent referencee.

24. A method of maintaining information regarding references in a user program, the method comprising the steps of:

A. making a reference to a non-existent referencee, said step (A) being performed a referencer;

B. creating a temporary referencee;

C. maintaining cross reference information regarding said reference based on said temporary referencee;

D. creating a new referencee which corresponds to said non-existent referencee by converting said temporary referencee into said new referencee; and F. maintaining cross reference information regarding said reference based on said new referencee after said new referencee is created.

25. A cross reference system for assisting programming of a control program for an industrial control system, said cross reference system providing information regarding references in said control program to facilitate program editing, said cross reference system comprising:

A. a plurality of referencees including first and second referencees,
 1. said first referencee being assigned a first unique identifier, and said first referencee comprising a subroutine, and
 2. said second referencee being assigned a second unique identifier, and said second referencee comprising a plurality of subcomponents;

B. a plurality of referencers including first, second and third referencers,
 1. said first referencer being assigned a third unique identifier, said first referencer making a first reference to said first referencee, and said first referencer comprising a subroutine call to said subroutine,
 2. said second referencer being assigned a fourth unique identifier, said second referencer making a second reference to said second referencee, and said second referencer referencing one of said plurality of subcomponents of said referencee,
 3. said third referencer being assigned a fifth unique identifier, and said third referencer making a third reference to a non-existent referencee; and C. a database, said database including a plurality of entries including first, second and third entries,
 1. said first entry corresponding to said first reference, said first entry including a first field which contains said first unique identifier, said first entry including a second field which contains said third unique identifier, and said first entry including a third field which contains information regarding whether said first reference is destructive,
 2. said second entry corresponding to said second reference, said second entry including a first field which contains said second unique identifier, said second entry including a second field which contains said fourth unique identifier, and said second entry including a third field which contains information regarding whether said third reference is destructive, and said second entry containing a fourth field containing information which indicates which one of said plurality of subcomponents of said referencee object is referenced by said referencer object, and
 3. said third entry corresponding to said third reference, said third entry including a first field which contains said fifth unique identifier and a second field which contains a sixth unique identifier, said sixth unique identifier corresponding to a temporary referencee established to maintain cross reference information for said non-existent referencee; and wherein said first referencee is responsible for notifying said first referencer when an aspect of said first referencee changes, and wherein said first referencer is responsible for updating said database after being notified by said first referencee that said aspect of said first referencee has changed;

wherein said second referencee is responsible for notifying said second referencer when an aspect of said second referencee changes, and wherein said second referencer is responsible for updating said database after being notified by said second referencee that said aspect of said second referencee has changed; and wherein said database is automatically updated each time said aspect of said first referencee changes and each time said aspect of said second referencee changes.

26. A cross reference system according to claim 25, wherein said first and second referencees and said first, second and third referencers are all objects of a control program for an industrial controller.

* * * * *